Jan. 17, 1939.  W. A. DUFFIELD  2,144,256
AUTOMATIC POWER TRANSMISSION
Filed Sept. 10, 1936  2 Sheets-Sheet 1
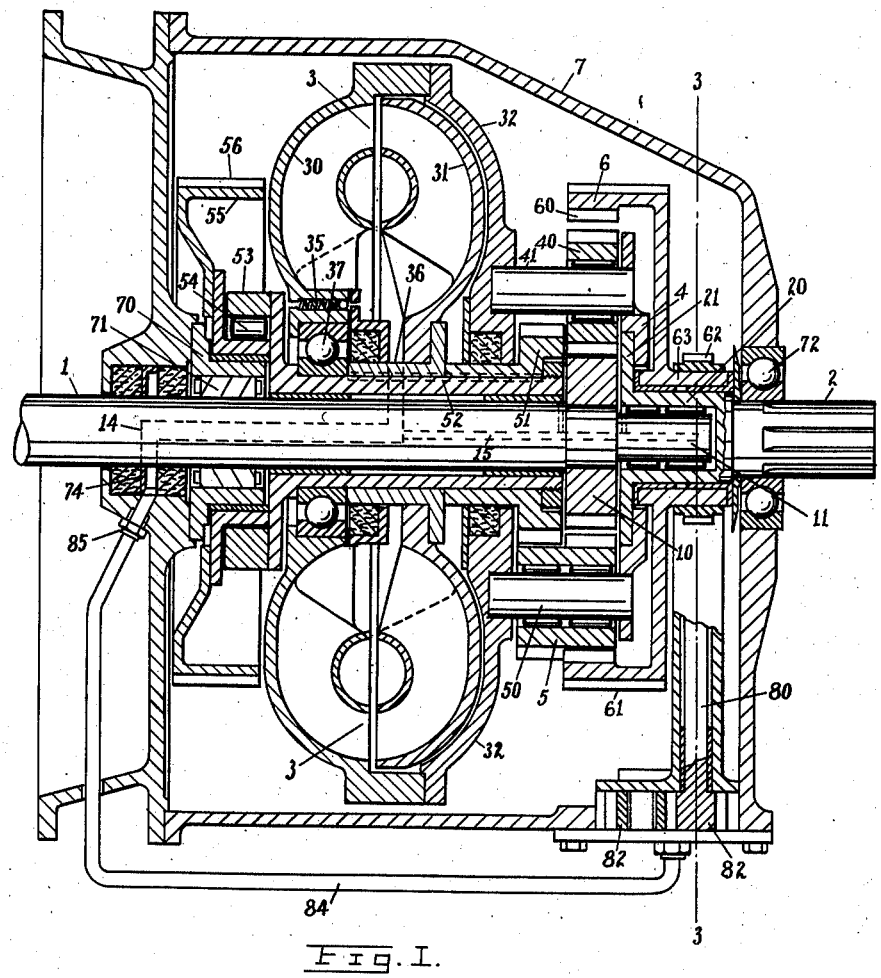
Fig. I.
INVENTOR
WILLIAM A. DUFFIELD
By
ATTORNEY Jan. 17, 1939.    W. A. DUFFIELD    2,144,256
AUTOMATIC POWER TRANSMISSION
Filed Sept. 10, 1936    2 Sheets-Sheet 2
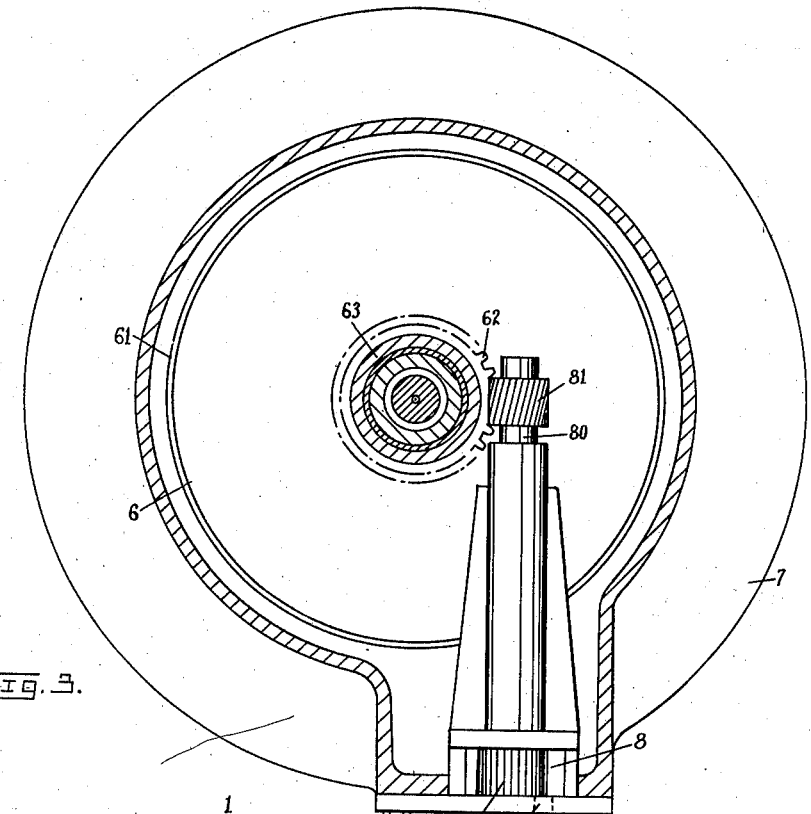
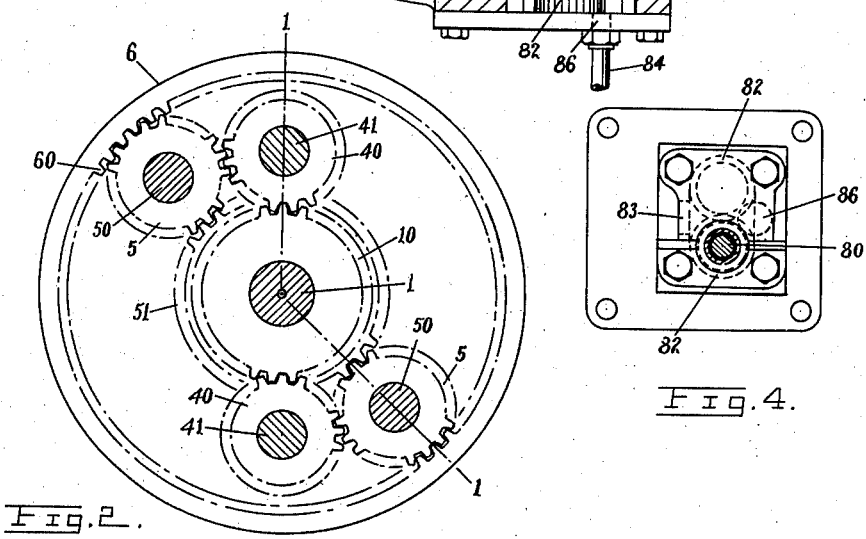
INVENTOR
WILLIAM A. DUFFIELD
ATTORNEY Patented Jan. 17, 1939

2,144,256

UNITED STATES PATENT OFFICE 2,144,256

AUTOMATIC POWER TRANSMISSION

William A. Duffield, Montreal, Quebec, Canada, assignor to Juno Corporation Limited, Montreal, Quebec, Canada, a company Application September 10, 1936, Serial No. 100,081

8 Claims. (Cl. 74—189.5)

This invention relates to variable speed transmission and particularly to means to provide an automatic mechanism for such transmission in automobiles and the like.

The object of the invention is to provide an improved assembly occupying the minimum space and simple mechanism whereby the changes of speed are obtained without the shifting of gears.

A further object is to provide a transmission including a Fottinger fluid coupling in which there is a continuous feed of fluid to the coupling and a pressure relief valve to secure a limited fluid pressure in the coupling so fed.

A further object is to provide a force feed lubrication throughout the mechanism by means of an improved form of pump mechanism whereby the fluid from the pump is free from contained air and is filtered.

A further object is to provide such a transmission with a positive reverse drive and planetary reduction gear in which the carrier is connected to the tail shaft and rotates this shaft in both forward and reverse drive.

Other objects will be disclosed in the specification following.

Reference is made to the accompanying drawings in which:

Figure 1 is a vertical longitudinal section through the axis of the shafts on the line 1—1 of Figure 2.

Figure 2 is an end view of the planetary gears.

Figure 3 is a vertical cross section on the line 3—3 of Figure 1.

Figure 4 is a top view of the pump.

Referring to Figure 1 the device comprises a shaft 1, driven from a motor through a clutch, which are not shown. The shaft 1 is journalled in the bearing 71 in the sleeve 70 of the casing 7.

The shaft 1 has a pinion 10, beyond which its end 11 is journalled in the sleeve 20 of the tail shaft 2. The shaft 2 is journalled in bearings 72 in the casing 7.

The sleeve 20 of the tail shaft has a flange 21 secured to the planetary gear carrier 4.

The pinion 10 on the shaft 1 meshes with the gear 40 journalled on the pin 41 in the carrier 4.

The gear 40 meshes with a gear 5 journalled on the pin 50 in the carrier 4. The gear 5 which is a wide gear, one half of which meshes with the internal gear 60 of the annulus 6, the other half meshes with a pinion 51 which is keyed to a sleeve 52 journalled on the shaft 1.

The annulus 6 is controlled by a brake band 61.

The fluid coupling 3 has its runner 31 keyed to the sleeve 52, while its driver 30 is journalled on the bearing 37 and is connected to the carrier 4 by the bowl 32.

The sleeve 52 has a flange and ring 53 which bears on an overrunning clutch 54 which is carried by a drum 55.

The drum 55 is journalled on the sleeve 70 secured to the casing 7 and is controlled by a brake band 56.

A pump 8 in the base of the casing 7 has a vertical shaft 80 with a gear 81 which meshes with a gear 62 on a sleeve 63 of the annulus 6. The pump has a screened inlet 83 from the bottom of the casing 7, the gears 82 force the oil through the outlet 86, and feeds through a pipe 84 to an inlet 85 into a chamber 74 in the casing 7 surrounding the shaft 1.

The shaft 1 has a passage 14 from the chamber 74 to inlets 36 in the sleeve 52 leading into the fluid coupling 3, and an extension 15 with outlets in the shaft.

The driver 30 of the coupling 3 has a spring controlled ball valve outlet 35 which opens into the casing 7.

The operation of the device is as follows:—

When the shaft 1 is rotated, its pinion 10 rotates the gear 40 on the carrier 4. This gear 40 rotates the gear 5 on the carrier 4. For forward drive the brake band 56 holds the drum 55 and overrunning clutch 54. This clutch holds the ring 53 and sleeve 52 from reverse rotation. But as the gear 5 would rotate the pinion 51 of the sleeve 52 in reverse rotation as the sleeve 52 is held from such rotation, the gear 5 travels around the pinion 51 and carries the carrier 4 and the tail shaft 2 in reduced or low speed forward rotation.

As the carrier 4 picks up speed, the driver 30 gradually couples with the runner 31, and the ring 53 of the sleeve 52 is made to overrun the clutch 54 until the entire mechanism is rotating at the drive speed of the shaft 1, when the members of the fluid clutch are coupled.

When the brakes are applied to the wheels, or an increased load is put on the tail shaft to slow it down, the driver 30 also slows down and the fluid coupling 3 slips. The direct drive then changes and again becomes a drive through the reduction gears. These changes up to direct drive and back to reduction drive take place gradually and smoothly and without any sudden strain on any of the parts of the mechanism.

The reverse drive is produced by releasing the brake band 56 and allowing the drum 55 and clutch 54 to run free. The brake band 61 is tightened to hold the annulus 6 from rotation. The gear 5 must now travel on the internal gear 60 of the annulus 6 in reverse rotation and by this means the carrier 4 and the tail shaft 2 are driven in reverse at low speed.

The pump 8 receives oil from the bottom of the casing 7 through a screen 83 and feeds it through the pipe 84 into the chamber 74. From this chamber it passes through the passage 14 in the shaft 1 through the apertures 36 in the sleeve 52 into the fluid coupling 3. While the forward drive continues the pump 8 keeps the fluid coupling filled with oil. If the feed is too rapid or the pressure of expansion due to heat reaches a predetermined pressure, the oil opens the valve 35 and passes back into the casing 7. Oil is also fed through an extension 15 of the passage 14 with suitable outlets in the shaft 1, to lubricate the planetary gearing and the tail shaft.

What I claim is:—

1. In an automatic power transmission, a fluid coupling of the Fottinger type, having driver and runner members, means to transmit power through a train of planetary reduction gears on a carrier secured to a tail shaft, the driver member of the coupling directly connected to the tail shaft by the carrier and means operated by the other member to cut out the reduction gear.

2. In an automatic power transmission, a fluid coupling of the Fottinger type, having driver and runner members, a power driven shaft having a pinion, a tail shaft journalled axially with the drive shaft, a carrier secured to the tail shaft, an annulus journalled on the tail shaft, intermeshing gears journalled on the carrier, the first of which meshes with the pinion of the drive shaft, the second of which meshes with the annulus, means to hold the annulus from rotation, the driver member of the fluid coupling connected to the carrier, the runner member keyed to a sleeve journalled on the drive shaft, having a pinion meshing with the second planetary gear, and an over running clutch operated by a brake band controlling the said sleeve.

3. In a power transmission, including a drive shaft having a pinion, a tail shaft secured to a carrier having planetary gears meshing with the pinion, said carrier secured to the driver of a fluid coupling of the Fottinger type having driver and runner members, the runner having a pinion meshing with the planetary gears, and an enclosing casing, means to pump oil from the casing into the fluid coupling and a pressure relief valve in the fluid coupling adapted to limit the oil pressure in the fluid coupling.

4. In an automatic power transmission, a casing, a fluid coupling of the Fottinger type having driver and runner members, a power driven shaft having a pinion, a tail shaft journalled axially with the power driven shaft, a planetary gear carrier secured to the tail shaft, two sets of intermeshing gears journalled on the carrier, a brake band controlled annulus, a sleeve journalled on the power driven shaft having a pinion, one set of gears meshing with the shaft pinion, the other set meshing with the annulus and with the sleeve pinion, a band controlled drum journalled on the casing, a ring extension to the sleeve, an over running clutch mounted on the drum and engaging the ring, the driver of the fluid coupling secured to the carrier, the runner keyed to the sleeve.

5. In an automatic power transmission, a casing, a fluid coupling of the Fottinger type having driver and runner members, a power driven shaft having a pinion, a tail shaft journalled axially with the power driven shaft, a planetary gear carrier secured to the tail shaft, two sets of intermeshing gears journalled on the carrier, a brake band controlled annulus, a sleeve journalled on the power driven shaft having a pinion, one set of gears meshing with the shaft pinion, the other set meshing with the annulus and with the sleeve pinion, a band controlled drum journalled on the casing, a ring extension to the sleeve, an over running clutch mounted on the drum and engaging the ring, the driver of the fluid coupling secured to the carrier, the runner keyed to the sleeve, a pump to feed oil from the casing into the fluid coupling, with a relief valve outlet in one of the members of the fluid coupling.

6. In an automatic power transmission, a casing, a fluid coupling of the Fottinger type having driver and runner members, a power driven shaft having a pinion, a tail shaft journalled axially with the power driven shaft, a planetary gear carrier secured to the tail shaft, two sets of intermeshing gears journalled on the carrier, a brake band controlled annulus, a sleeve journalled on the power driven shaft having a pinion, one set of gears meshing with the shaft pinion, the other set meshing with the annulus and with the sleeve pinion, a band controlled drum journalled on the casing, a ring extension to the sleeve, an over running clutch mounted on the drum and engaging the ring, the driver of the fluid coupling secured to the carrier, the runner keyed to the sleeve, a pump in the base of the casing having a spindle geared to the drive mechanism, a screened inlet, an outlet to a pipe leading to a chamber surrounding the drive shaft, passages in the drive shaft from the chamber to outlets into the fluid coupling and into the gearing about the drive shaft, with a relief valve outlet in one of the fluid coupling members.

7. In an automatic power transmission, a casing, a drive shaft having a pinion, a tail shaft, a fluid coupling of the Fottinger type having driver and runner members, a planetary gear carrier connected to the tail shaft and the driver, two sets of intermeshing gears journalled on the carrier, a sleeve journalled on the drive shaft having a pinion, a band controlled annulus journalled on the tail shaft, one set of gears meshing with the shaft pinion, the other set meshing with the annulus and the sleeve pinion, and a one-way clutch to the sleeve.

8. In an automatic power transmission, a casing, a drive shaft having a pinion, a tail shaft, a fluid coupling of the Fottinger type having driver and runner members, a planetary gear carrier connected to the tail shaft and the driver, two sets of intermeshing gears journalled on the carrier, a sleeve journalled on the drive shaft having a pinion, a band controlled annulus journalled on the tail shaft, one set of gears meshing with the shaft pinion, the other set meshing with the annulus and the sleeve pinion, and a one-way clutch to the sleeve, a fluid pump geared to the annulus adapted to pump oil from the casing into the fluid coupling during the forward drive of the transmission.

WILLIAM A. DUFFIELD.